Nov. 28, 1950  E. H. JACKSON  2,531,684
PORTABLE BARBECUE
Filed May 20, 1946
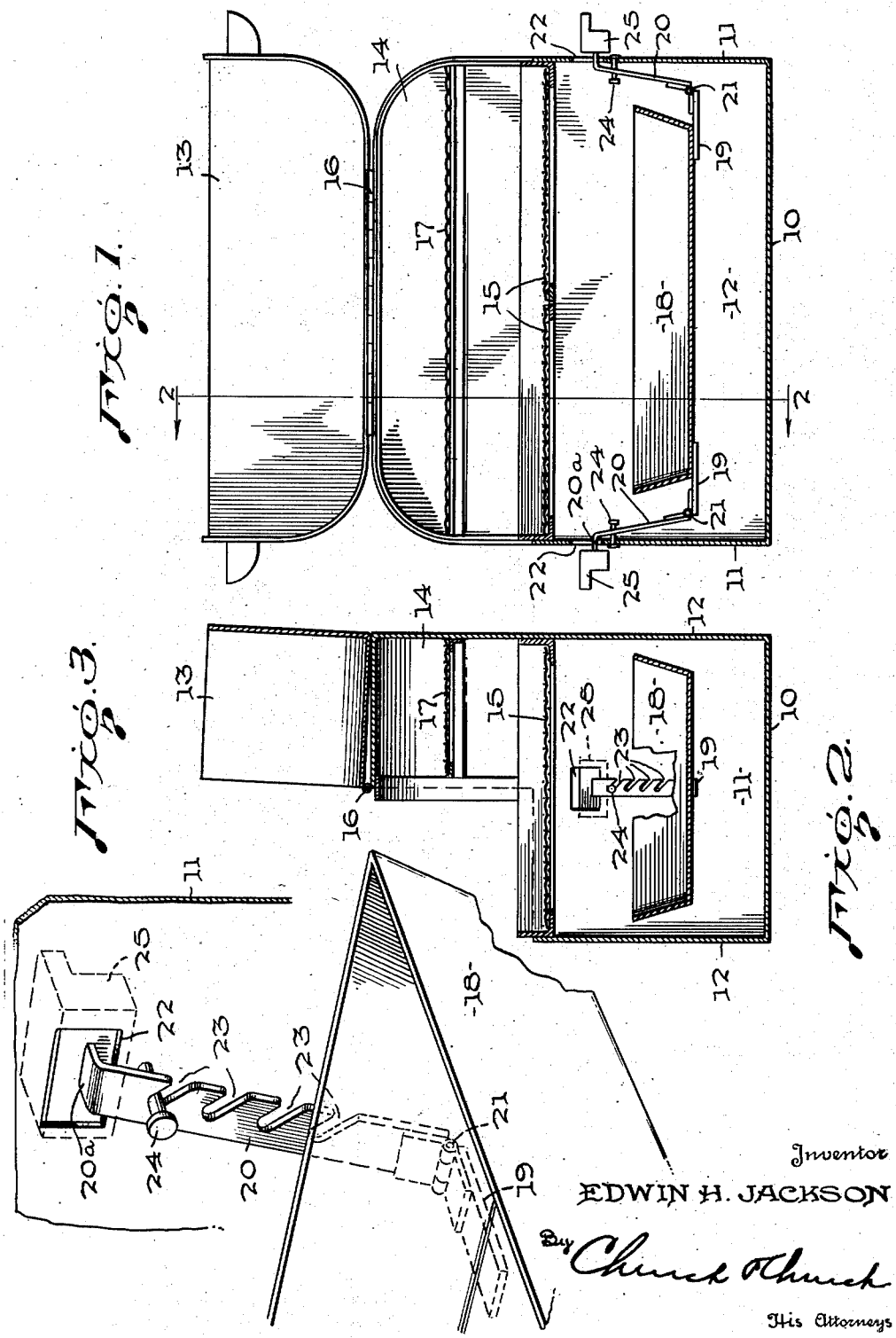
Inventor
EDWIN H. JACKSON
By Church & Church
His Attorneys Patented Nov. 28, 1950

2,531,684

UNITED STATES PATENT OFFICE 2,531,684

PORTABLE BARBECUE

Edwin H. Jackson, Fort Worth, Tex., assignor to The Ranch House, Fort Worth, Tex., a partnership composed of Albert Evans, Jr., and Edwin H. Jackson Application May 20, 1946, Serial No. 670,963

2 Claims. (Cl. 126—25)

This invention relates to improvements in barbecues or grills, particularly of the portable type commonly used on occasions such as camping or picknicking or under other circumstances out in the open.

In structures of this type a bed of coals used for cooking is mounted below a grill or grid and the primary object of the present invention is to provide readily accessible and easily operated means for adjusting the fire box or fire pot or other container for the live coals within the casing so as to alter the distance between the bed of coals and grid, depending upon the degree of heat desired in cooking or preparing different types of food on the grid.

Another object is to provide means for adjusting the fire pot with respect to the grid which are operable from the exterior of the barbecue casing or housing so that a protective covering can be provided over the grid. By reason of the fact that the fire pot is adjustable from the exterior of the casing or housing all danger of one's hands being injured or burnt in adjusting the bed of coals is eliminated.

Still another object is to provide a casing for the grid and fire box having a permanent upper section above the grid in which a warming shelf is mounted, this permanent upper portion of the casing and said shelf being possible in the present instance without interfering with the adjustability of the fire pot by reason of the fact that the latter is adjustable from the exterior of the casing as previously mentioned.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a vertical sectional view taken longitudinally of the barbecue casing, portions not involved in the present invention being omitted for purposes of clarity;

Fig. 2 is a vertical sectional view taken in a plane indicated by the line 2—2 of Fig. 1; and Fig. 3 is a perspective view illustrating one end of the fire plot with its attached supporting arm and a section of the adjacent end wall of the barbecue casing.

In the present illustration the casing of the barbecue comprises the bottom 10, the end walls 11, side walls 12, and the top which is formed of front and rear sections 13, 14. The rear section 14 of the top and the rear portions of the end walls 11 may be formed of a continuous strip of metal attached to the rear wall of the casing so that it forms a permanent cover for the rear half of the grid 15. The front section 13 of the top is hinged along its rear edge to the rear section 14, the hinges being indicated at 16, and this front section of the top may also be formed of a single strip of sheet metal of sufficient length to constitute the upper portions of the end walls 11, the upper portion of the front wall 12 above the grid being attached to said front section of the top. In other words, the casing may be said to consist of a lower section in which the grid 15 is mounted and an upper section divided lengthwise to form the permanent cover portion which includes the rear section 14 of the top and a hinged front cover section which comprises the front section 13 of the top and which can be swung back on top of the rear section 14, as shown in Fig. 2, to expose the grid and the interior of the permanent rear cover portion or which may be swung downwardly to entirely enclose the grid. It is preferred to provide a cover of this type in order to protect the so-called warming shelf 17, which is built into the permanent rear cover section suitably spaced above the grid and below the permanent rear section 14 of the top. As will be understood, this so-called warming shelf 17 may be formed of a perforate member on which articles to be kept warm may be placed.

The fire pan or fire pot 18 is supported within the casing below the grid and is adapted to be adjusted vertically in order that the degree of heat with which various foods are prepared may be regulated. However, in providing for the adjustability of this fire pan it is desired that the same be accomplished without interference by the cover portions of the casing or by the warming shelf 17 and, also, without danger of one's hands being injured or burnt while effecting an adjustment of the pan. To these ends the pan is provided with supporting members which are accessible from the exterior of the housing or casing. Preferably, the pan has hinge plates 19 attached to its ends and supporting bars or members 20 whose lower extremities are pivoted to these hinges 21 project upwardly and through openings 22 in the opposite end walls of the casing. Also, these supporting bars or members are adapted to be releasably supported in any desired position vertically of the casing, suitable interlocking elements being provided on the casing and bars for this purpose. In the present instance, the bars 20 are shown provided with recesses 23 in which studs or bolts 24 mounted on the interior of the end walls 11 are adapted to engage. Thus the fire pan can be readily elevated or lowered simply by grasping the exposed outer ends of the supporting bars 20 and disengaging said bars from the locking bolts to permit them to be raised or lowered as desired after which the bolts are re-engaged in the proper recess 23. The hinged connection 21 between the supporting members and fire pan will compensate for any lateral movement that may be imparted to the bars by reason of any such adjustments. The upper ends of the supporting bars 20 may be offset, as shown at 20a, to provide hand grip portions but it is preferred that these offset portions 20a have handle members 25 mounted thereon. Materials which are non-heat conducting should be used for the handles and in all instances the handles are of a width greater than the width of the openings 22 in order to eliminate all possibility of the supporting bars accidentally being withdrawn inwardly through the openings 22.

From the foregoing it will be seen that the fire pan is readily adjustable with respect to the grid 15 without danger of the user's hands being burned by reason of the fact that the pan can be so adjusted from the exterior of the casing. At the same time the casing is provided with a suitable cover not only for protection of the entire interior of the barbecue when it is not in use but also for the warming plate 17 when the barbecue is in use and, even under these latter circumstances, the fire pan is still readily adjustable. In other words, the presence of the permanent rear section of the cover and the enclosed warming plate does not interfere with the adjustment of the fire pan by reason of the fact that the adjusting means are accessible from the exterior of the casing and when the supporting bars are raised their upper portions project at the exterior of the casing so that the cover and warming shelf do not obstruct the up movement of those members.

It might be added that the present barbecue structure has been illustrated more or less schematically in the sense that only those portions of the structure involved in the present invention are illustrated in detail, other portions such as storage compartments and the like having been omitted in the present illustration as they form no part of the invention claimed herein.

What is claimed is:

1. In a barbecue comprising a casing having side and end walls housing a grid and a fire pot vertically adjustable with respect to said grid, two opposite walls of the casing having openings therein, supporting bars hinged to opposite ends of the pot within the casing to pivot solely about axes parallel to said ends and projecting upwardly through said openings to the exterior of the casing, heat insulating handles on the opposite ends of the supporting bars for raising and lowering the latter, and studs on said apertured walls of the casing projecting inwardly toward each other, said bars being formed with locking recesses inclined upwardly from one side for engagement with said studs.

2. In a barbecue comprising a casing having side and end walls housing a grid and a fire pot, said fire pot being vertically adjustable with respect to said grid, two opposite walls of said casing having apertures therein, vertically disposed supporting bars hinged at their lower ends to opposite ends of the fire pot to pivot solely about axes parallel to said opposite ends, said bars having their upper ends extending through said openings to the exterior of the casing, heat insulating handles on the exposed ends of the supporting bars for raising and lowering the latter, and interlocking elements on said bars and the inner surfaces of said opposite walls of the casing for supporting said bars in their adjusted positions, said handle members for the bars being of a width greater than the width of the openings in the casing walls whereby accidental movement of the entire bars through the openings into the casing is prevented.

EDWIN H. JACKSON.

REFERENCES CITED

The following references are of record in the file of this patent:

UNITED STATES PATENTS

| Number | Name | Date |
|---|---|---|
| 34,385 | Williams | Feb. 11, 1862 |
| 137,467 | Moore | Apr. 1, 1873 |
| 495,507 | Miller | Apr. 18, 1893 |
| 1,759,773 | Adamson | May 20, 1930 |
| 2,009,189 | Ash | July 23, 1935 |
| 2,033,898 | Krebs | Mar. 10, 1936 |
| 2,221,098 | Langsam | Nov. 12, 1940 |
| 2,307,914 | Bitney | Jan. 12, 1943 |
| 2,334,847 | Spiers | Nov. 23, 1943 |
| 2,425,036 | Howe | Aug. 5, 1947 |
| 2,441,190 | Fuller | May 11, 1948 |